Figures 1, 2:
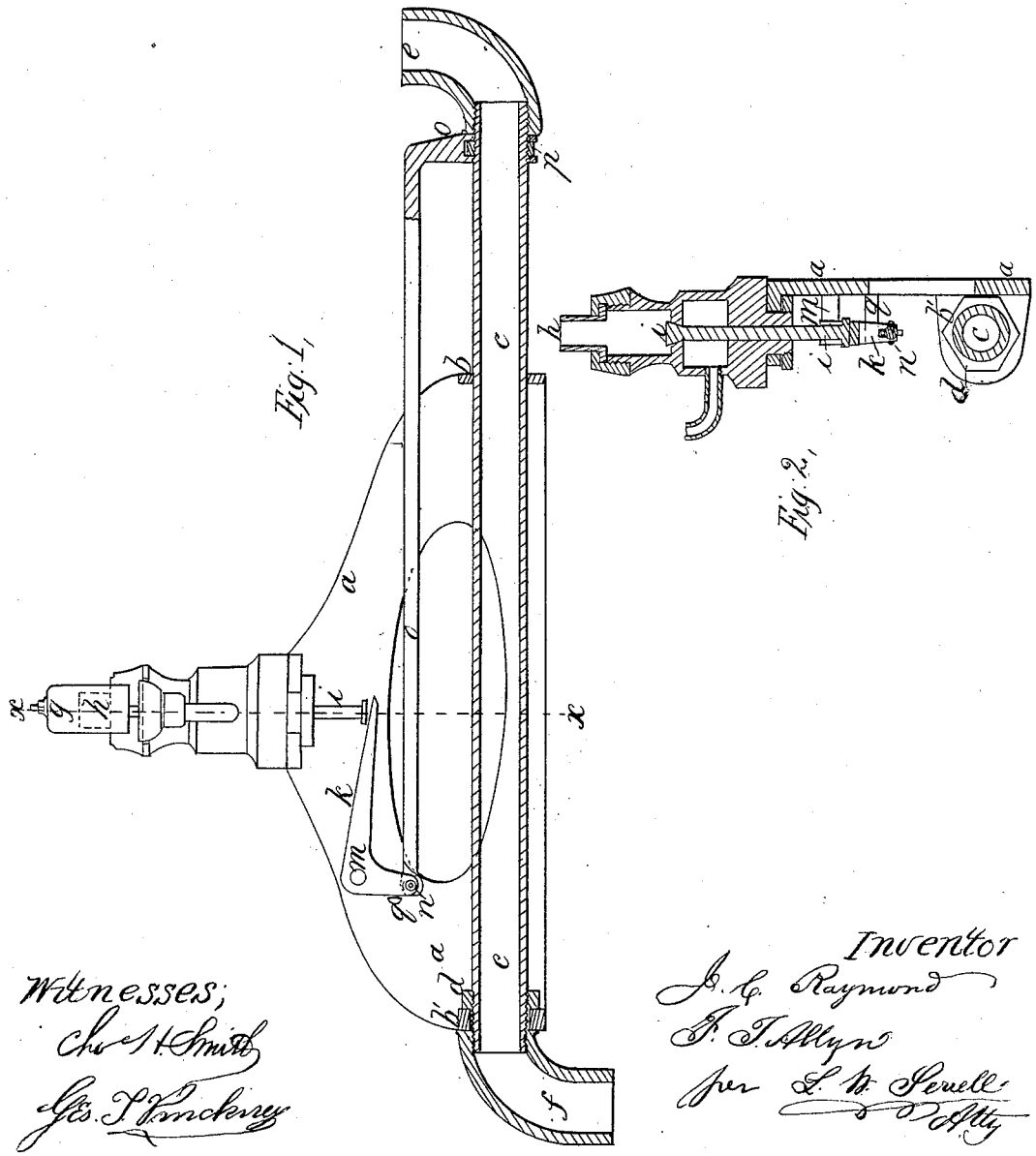

Raymond & Allyn,
Steam-Boiler Indicator.
No. 78,481.  Patented June 2, 1868.

Witnesses;
Chs. H. Smith
Geo. S. Pinckney

Inventor
J. C. Raymond
F. T. Allyn
per L. W. Serrell
Atty

UNITED STATES PATENT OFFICE.

JOHN C. RAYMOND AND FRANCIS T. ALLYN, OF BROOKLYN, NEW YORK, ASSIGNORS TO F. T. ALLYN.

IMPROVEMENT IN LOW-WATER INDICATORS.

Specification forming part of Letters Patent No. 78,481, dated June 2, 1868.

*To all whom it may concern:*

Be it known that we, JOHN C. RAYMOND and FRANCIS T. ALLYN, of Brooklyn, in the county of Kings and State of New York, have invented and made a certain new and useful Improvement in Low-Water Indicators for Steam-Boilers; and we do hereby declare the following to be a full, clear, and exact description of the said invention, reference being had to the annexed drawing, making part of this specification, wherein—

Figure 1 is a longitudinal section of the said indicator-tube, with the whistle in elevation; and Fig. 2 is a transverse section at the line $x$ $x$, without the whistle.

Similar marks of reference denote the same parts.

The nature of our said invention consists in a low-water indicator formed of the expansive tube and whistle, before known, in combination with a bent lever and stop and a connecting-rod to the moving end of the tube, at which point the connecting-nut surrounding the tube is between two eyes or collars upon the said connecting-rod, so that on turning said nut in one direction the whistle will be made to blow, thus allowing the adjustment to be such that a very small expansion of the tube will blow the whistle, but, if the nut is turned the other way to stop the whistle blowing when the tube is expanded by being filled with steam, the indicator will show that it has been tampered with by the injury resulting to the parts by the bent lever and rod coming forcibly against the stop when the tube cools, and if the metal is bent or compressed permanently, but not broken, the parts will operate again the next time the tube is expanded, thus giving additional security against the low-water indicator being tampered with by the engineer or attendant.

In the drawing, $a$ is a plate attached to any convenient support at the proper level. $b$ $b'$ are ears thereon, through which the tube $c$ passes, and is firmly clamped to the ear $b'$ by the nut $d$, but allowed to slide freely through the ear $b$. $e$ is a pipe to the steam-space of the boiler, and $f$ is a pipe to the water-space, the usual bends and cocks being provided. $g$ is a whistle of ordinary character, and $h$ is a pipe conveying steam from the boiler to the valve-chamber, and $i$ is the valve and stem. $k$ is a bent lever on a fulcrum, $m$, upon the plate $a$, the longer arm of which lever passes below the valve-stem $i$, and the shorter arm is connected by a joint, $n$, to the rod $o$, that passes to the moving end of the tube $c$, where it is formed as an eye or fork around such tube secured by the nut $p$.

It will now be understood that when the water descends so that steam takes the place of the cool quiescent water in the pipe $e$, the tube $c$ expands, and through the rod $o$ acts on the short arm of the lever $k$, the long arm of which opens the valve $i$ and blows the whistle, and when the water is supplied into the boiler sufficiently to cool the pipe by filling the same, said pipe $c$ contracts and allows the valve $i$ to close.

The nut $p$ is introduced between two collars on the rod $o$, so that the adjustment may be easily effected, and we employ a fixed stop, $q$, on the plate $a$, which prevents the alarm being rendered inoperative, because the nut $p$ cannot be screwed along in the direction to relieve the parts from acting as the tube expands; and should the nut $p$ be screwed toward the stop $q$ while the tube $c$ is expanded, the parts will be either injured or receive a permanent bend or shortening as the tube contracts, so that the apparatus will operate the next time the water is low and the tube expands.

We disclaim everything shown and described in the patent of C. H. Brown, August 7, 1860, and in that of Adam Carr, April 16, 1861; but What we do claim as new, and desire to secure by Letters Patent, is—

The stop $q$, in combination with the lever $k$, rod $o$, nut $p$, expanding-tube $c$, and with the valve-stem $i$ of the whistle, all as shown and described.

In witness whereof we have hereunto set our signatures this 12th day of March, A. D. 1868.

JOHN C. RAYMOND.
FRANCIS T. ALLYN.

Witnesses:
CHAS. H. SMITH,
GEO. T. PINCKNEY.